United States Patent [19]

Lin

[11] Patent Number: 4,833,368

[45] Date of Patent: May 23, 1989

[54] OUTDOOR LIGHTING CONTROLLER INCLUDING WIPER ELEMENT FOR LIGHT SENSOR

[76] Inventor: Aaron Lin, Fl. 4, No. 127, Tun Huang Rd., Taipei, Taiwan

[21] Appl. No.: 145,324

[22] Filed: Jan. 19, 1988

[51] Int. Cl.⁴ .............................................. H05B 41/14
[52] U.S. Cl. .................................... 315/150; 315/158; 315/159; 250/214 AL
[58] Field of Search ............... 315/150, 158, 149, 156, 315/159; 250/214 AL, 215; 15/246

[56] References Cited

U.S. PATENT DOCUMENTS

| | | | |
|---|---|---|---|
| 3,473,084 | 10/1969 | Dodge | 315/158 |
| 3,704,374 | 11/1972 | Kaufmann | 250/214 AL |
| 3,961,183 | 6/1976 | Dubot et al. | 250/214 X |
| 3,962,600 | 6/1976 | Pittmann | 315/158 |
| 4,595,860 | 6/1986 | Taylor | 315/158 |
| 4,713,583 | 12/1987 | Hochstein | 315/82 |

*Primary Examiner*—Stuart S. Levy
*Assistant Examiner*—Steven M. duBois
*Attorney, Agent, or Firm*—Hoffman, Wasson, Fallow & Gitler

[57] ABSTRACT

An outdoor lighting controller including a light sensing element for automatically activating and de-activating an outdoor light source. A wiper is provided for removing accumulated dust from the light sensing element. The wiper is initiated when the light source is activated.

8 Claims, 1 Drawing Sheet

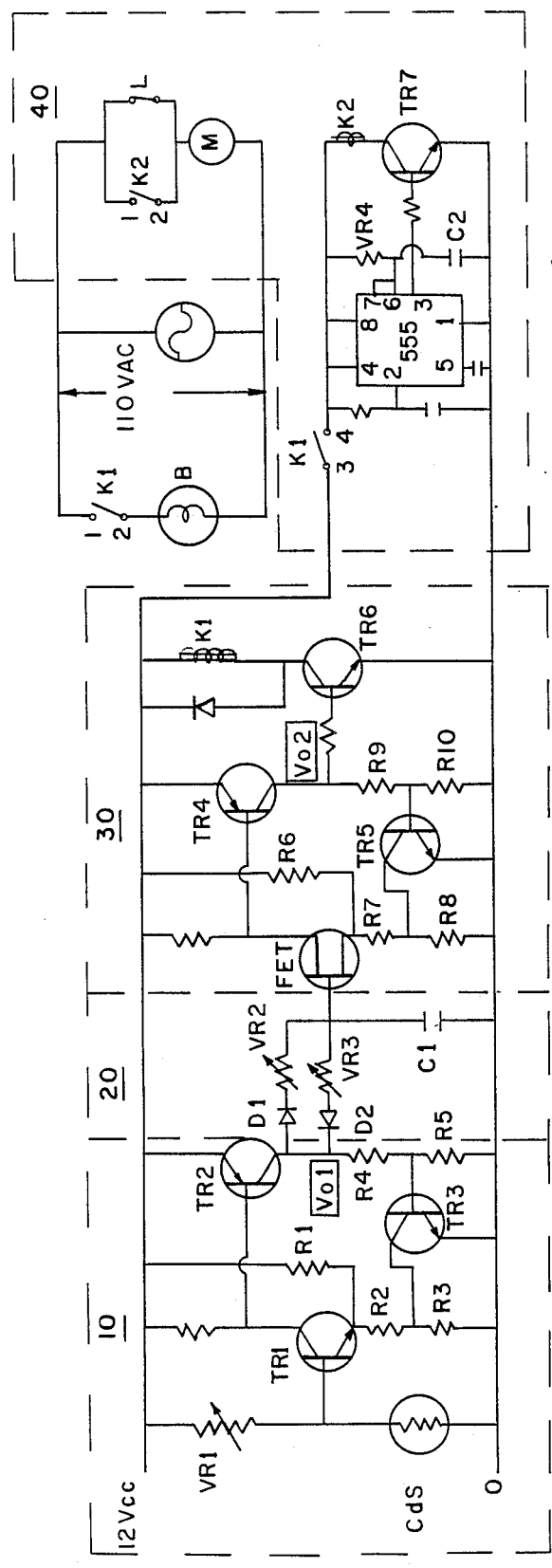
FIG. 1.
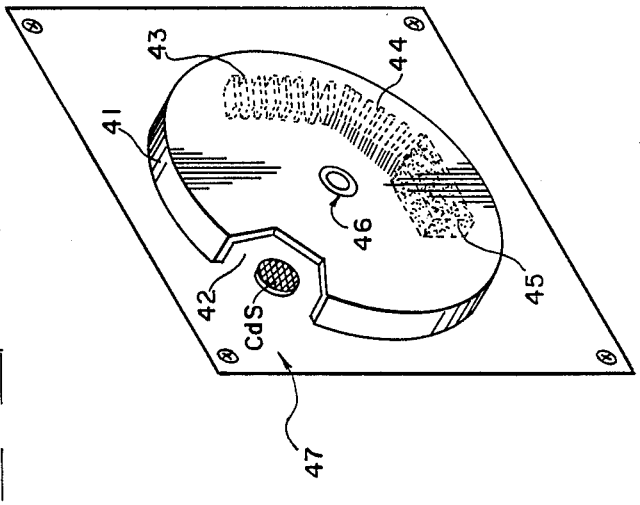
FIG. 3.
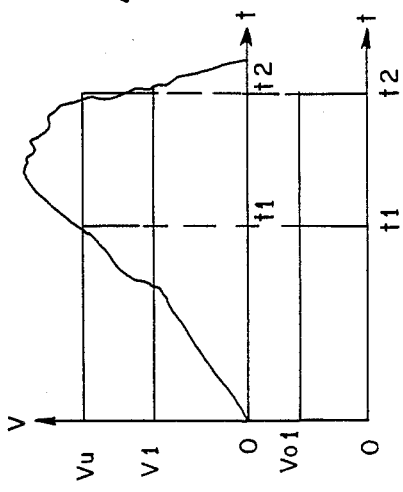
FIG. 2a.
FIG. 2b.

OUTDOOR LIGHTING CONTROLLER INCLUDING WIPER ELEMENT FOR LIGHT SENSOR

BACKGROUND OF THE INVENTION

Conventional outdoor lighting controllers are generally composed of a light sensing element such as fabricated from cadmium sulfide for sensing variation of daylight level and a bimetallic thermal switch in the power supplying circuit for the light being controlled. A series circuit comprising the light sensing element and a resistive wire is connected in parallel to a power source supplying the light being controlled, wherein the resistive wire is used to heat the bimetallic thermal switch when the light sensing element senses increase of daylight level and exhibits a low resistance.

As the light sensing element senses daylight waning at dusk, the light sensing element exhibits a high resistance approximately on the order of 100 mego-ohms. Because there is only a small amount of electric current flowing through the series circuit comprising the light sensing element and the resistive wire, the bimetallic thermal switch in the power circuit is thus released to turn on the light being controlled.

As the light sensing element senses daylight increase at dawn, the light sensing element exhibits a low resistance as stated earlier whereby the electric current flowing through the series circuit comprising the light sensing element and the resistive wire increases to a great extent. The bimetallic thermal switch in the power supplying circuit is thus heated by the resistive wire to switch off the light being controlled.

While the stated conventional controller is quite simple in construction, it suffers from a plurality of defects which were left unsettled heretofore. The defects inherent in the stated conventional controller are herein briefly described as follows:

(1) The series circuit comprising the light sensing element and the resistive wire is directly connected to a 110 VAC or 220 VAC power source or even a higher one requiring that a light sensing element with higher power rating must be used. The resultant cost is thus much higher as compared with the light sensing element used in the controller disclosed by the present invention;

(2) To permit operation over a wide ambient range of temperature, the stated conventional controller is additionally provided with a compensating device formed of a metallic plate which unavoidably suffers from fatigue in the case of continuous operation;

(3) The stated conventional controller is generally installed with the light sensing device covered by a transparent cap. It is quite obvious that the accumulation of dust on the outer surface of the transparent cap will prevent some daylight from penetrating the cap. As a result, the weakened light level inside the cap will make the controller initiated earlier than it should be at dusk and disabled later than it should be at dawn. As known, street lamps in heavier air polluted areas are generally controlled by man; this is quite uneconomical and the controlling is not always duly performed. An outdoor lighting controller is therefore provided according to the present invention to remove defects inherent in the conventional outdoor lighting controllers.

SUMMARY OF THE INVENTION

The present invention is directed to an outdoor lighting controller comprising a first Schmitt trigger, a second Schmitt trigger, a charging-discharging circuit between the first and second Schmitt triggers, a light sensing element incorporated in the first Schmitt trigger for sensing variation of daylight level and a wiping device for removing accumulated dust from the light sensing element.

As daylight level wanes to a predetermined level, the first Schmitt trigger is initiated to charge the charging-discharging circuit. The second Schmitt trigger is subsequently initiated by the energy stored in the charging-discharging circuit to turn on the light being controlled when the charging-discharging circuit is sufficiently charged. At the time when the light being controlled is turned on, the wiping device is also initiated for removing accumulated dust from the light sensing element.

As daylight level increases and reaches a predetermined level, the first Schmitt trigger is disabled, while the light being controlled is held energized until the energy stored in the charging-discharging circuit drops sufficiently and the second Schmitt trigger is disabled.

BRIEF DESCRIPTION OF THE DRAWINGS

In order that the present invention may be well understood, an exemplary embodiment thereof will now be described by way of example with reference to the accompanying drawings, in which:

FIG. 1 is a circuit diagram of the outdoor lighting controller according to the present invention;

FIGS. 2a and 2b are curve diagrams respectively showing electric potential developed across the light sensing element according to variation of daylight level and an output electric potential developed by the first Schmitt trigger; and FIG. 3 is a perspective view of the wiper for the controller illustrated in FIG. 1.

DETAILED DESCRIPTION OF THE PREFERRED EMBODIMENT

Referring initially to FIG. 1, the outdoor lighting controller according to the present invention comprises a first Schmitt trigger 10, a charging-discharging circuit 20, a second Schmitt trigger 30 and a wiping device 40. As illustrated, a light sensing element cds is incorporated in first Schmitt trigger 10 for sensing variation of daylight level. An adjustable resistor VR1 is properly adjusted to develop an electric potential across light sensing element cds. With reference to the arrangement of first Schmitt trigger 10, it is appreciated that the electric potential VE developed on the emitter of transistor TR1 is $$VE = \frac{Vcc}{R1 + R2 + R3}(R2 + R3)$$

Since the electric potential developed across light sensing element cds is lower than the sum of the emitter potential VE and the barrier voltage Vr of transistor TR1, transistor TR1 is normally held off. However, transistor TR1 will be turned on as light sensing element cds senses daylight waning at dusk and the electric potential developed across the same goes up above the sum of VE and Vr as indicated at Vu at time t1 in FIG. 2a. Once transistor TR1 is turned on, transistors TR2 and TR3 are sequentially turned on, resistor R3 in the emitter circuit of transistor TR1 is therefore shorted out by transistor TR3 to step up output voltage Vo1 developed on the collector of transistor TR2 as shown in FIG. 2b.

The charging-discharging circuit 20 following first Schmitt trigger 10 comprises a charging branch and a discharging branch, wherein the charging branch is composed of diode D1, adjustable resistor VR2 and a common capacitor C1, and the discharging branch is composed of diode D2, adjustable resistor VR3 and the common capacitor C1. The common capacitor C1 is charged through diode D1 and adjustable resistor VR2 when output voltage Vo1 is sufficiently stepped up. The length of time required to charge capacitor C1 to a level sufficient to enable the following Schmitt trigger 30 depends upon the setting of adjustable resistor VR2.

As stated above, the energy stored in capacitor C1 is used to drive second Schmitt trigger 30 which is similar to first Schmitt trigger 10 except that a field effect transistor FET is used in the input stage thereof. The field effect transistor FET provided in second Schmitt trigger 30 exhibits a high input resistance preventing absorption to charging current which should be diverted into capacitor C1.

Once field effect transistor FET is turned on by the energy stored in capacitor C1, transistors TR4 and TR5 are sequentially turned on, resistor R8 in the source circuit of field effect transistor FET is therefore shorted out by transistor TR5 to step up output voltage Vo2 developed on the collector of transistor TR4. As output voltage Vo2 is sufficiently stepped up, transistor TR6 following second Schmitt trigger 30 is subsequently turned on. As can be seen from FIG. 1, there is a relay K1 arranged in the collector circuit of transistor TR6. When relay K1 is energized by turning on transistor TR6, the normally opened contacts 1 and 2 in the power supplying circuit are actuated to turn on the light B being controlled.

Since resistor R3 has been shorted out by transistor TR3, the electric potential VE developed on the emitter of transistor TR1 is now reduced to $$V'E = \frac{Vcc}{R1 + R2} R2$$

Accordingly, it can be appreciated that transistor TR1 will be turned off, when light sensing element cds senses daylight increase at dawn and the electric potential developed across light sensing element cds drops below the sum of the emitter potential V'E the barrier voltage Vr of transistor TR1 as indicated at VL at time t2 in FIG. 2a.

Once transistor TR1 is turned off, transistors TR2 and TR3 are subsequently turned off. At this duration, the energy stored in capacitor C1 discharges through adjustable resistor VR3, diode D2 and resistors R4 and R5; however, capacitor C1 still has sufficient energy allowing second Schmitt trigger 30 to remain enabled and the light B being controlled is continuously energized by 110 VAC power source through contacts 1 and 2 actuated by relay K1. As capacitor C1 discharges sufficiently, field effect transistor FET and hence second Schmitt trigger 30 are disabled. Output voltage Vo2 developed on the collector of transistor TR4 is no longer procured, transistor TR6 is thus turned off to de-energize relay K1, the contacts 1 and 2 in the power supplying circuit are released to turn off the light B being controlled.

As stated above, the first Schmitt trigger 10 is enabled only when the daylight shining on the light sensing element cds wanes and the electric potential developed across the same increases sufficiently, while the second Schmitt trigger 30 is enabled to turn on the light B being controlled only when capacitor C1 in charging-discharging circuit 20 is sufficiently charged. In contrast, the first Schmitt trigger 10 is disabled only when the daylight shining on the light sensing element cds increases and the electric potential developed across the same drops sufficiently, while the second Schmitt trigger 30 is disabled to turn off the light B being controlled only when capacitor C1 in charging-discharging circuit 20 discharges sufficiently. Therefore, the charging-discharging circuit 20 has functioned as a time-delay circuit between first and second Schmitt triggers so that operation of the present controller by transient light and lighting flashes is completely prevented.

Another important feature of the present invention is that the controller disclosed by the present invention additionally provides a wiping device 40 as shown in FIG. 1, which essentially comprises a mono-stable multivibrator mainly composed of an integrated circuit 555 and a wiper best illustrated in FIG. 3. As illustrated, the wiper has a cap member 40 secured on a shaft 47 through a plate member 46 on which light sensing element cds is mounted. An opening 42 in alignment with light sensing element cds is formed along the circumference of cap member 41. Wiping elements such as rubber sheet 43, brush 44 and sponge 45 are stuck on the inner surface of cap member 41 in such a way that the wiping elements 43-45 wipe light sensing element cds in sequence when cap member 41 is driven by a motor M (see FIG. 1) through shaft 47. Each time when first and second Schmitt triggers 10 and 30 are enabled as stated earlier to turn on the light B being controlled, the mono-stable multivibrator composed of integrated circuit 555 is also triggered through contacts 3 and 4 actuated by relay R1. Transistor TR7 following the mono-stable multivibrator is hence turned on to energize relay K2 in the collector circuit thereof. At this time, the motor M for driving the wiper shown in FIG. 3 is energized by 110 VAC power source through contacts 1 and 2 actuated by relay K2. In the preferred embodiment, each pulse signal leading from the mono-stable multivibrator is just sufficient for the motor M to turn the wiper for three rotations. During each rotation, wiping elements 43-45 sequentially wipe light sensing element cds so that dust accumulated on the same can be completely removed. After rotation of the wiper, the opening 42 on the cap member 41 should return to the position in alignment with light sensing element cds for sensing next daylight level variation. If the pulse signal leading from the mono-stable multivibrator expires and relay K2 is de-energized before opening 42 reaches light sensing element cds, the motor M is continuously energized through the closed limit switch L to turn the wiper until the closed limit switch L is actuated by a protrusion (not shown) provided on the shaft 47 and opening 42 exposes light sensing element cds.

As can be appreciated from the above description, the outdoor lighting controller provided by the present invention is an electronic outdoor lighting controller with a plurality of advantages, such as the controller can be operated by a DC power source with lower electric potential (12 DCV in the preferred embodiment) whereby longer life and lower manufacturing costs are expected as compared with conventional controllers. In addition, no thermal element is used in the present controller; performance is by no means susceptible to variation of ambient temperature. Furthermore, the provision of a unique wiping device enhances performance reliability.

The present invention may be embodied in other specific form without departing from the spirit or attributes thereof and accordingly, reference should be made to the appended claims rather than to the foregoing specification as indicating the scope of the present invention.

I claim:

1. A controller for an outdoor light source comprising:
   a voltage source;
   a first Schmitt trigger connected to said voltage source and provided with a light sensing element for sensing the variation in ambient light, said first Schmitt trigger enabled when the level of ambient light falls below a predetermined value;
   a charging-discharging circuit functioning as a time delay circuit connected to the output of said first Schmitt trigger, said charging-discharging circuit provided with an energy storage device for accumulating energy when said first Schmitt trigger is enabled;
   a second Schmitt trigger circuit connected to the output of said charging-discharging circuit for activating the outdoor light source utilizing the energy accumulated in said charging-discharging circuit; and
   a wiping device for removing accumulated dust from said light sensing element, said wiping device including
   a motor;
   means for energizing said motor when said first and second Schmitt triggers are enabled; and
   a cap member connected to said motor for rotation across said light sensing element.

2. The outdoor light controller in accordance with claim 1, wherein a portion of said cap member is provided with a means for physically removing accumulated dust from said light sensing element.

3. The outdoor light controller in accordance with claim 2, wherein said means for physically removing accumulated dust includes a rubber sheet.

4. The outdoor light controller in accordance with claim 2, wherein said means for physically removing accumulated dust includes a rubber brush.

5. The outdoor light controller in accordance with claim 2, wherein said means for physically removing accumulated dust includes a rubber sponge.

6. The outdoor light controller in accordance with claim 1, wherein said cap member is provided with an opening formed on the periphery of said cap member, said opening aligned with said light sensing element when said motor is de-energized.

7. The outdoor light controller in accordance with claim 6, further including a limit switch connected to said motor for ensuring said opening provided on said cap member is aligned with said light sensing element when said cap member is at rest.

8. The outdoor light controller in accordance with claim 2, wherein said means for physically removing accumulated dust includes a rubber sheet, a brush and a sponge.

* * * * *